US011573809B2

(12) United States Patent
Eckert et al.

(10) Patent No.: US 11,573,809 B2
(45) Date of Patent: Feb. 7, 2023

(54) METHOD AND SYSTEM FOR PROVIDING VIRTUAL SERVICES

(71) Applicant: Degussa Bank AG, Frankfurt am Main (DE)

(72) Inventors: Jürgen Eckert, Frankfurt am Main (DE); Michael Horf, Frankfurt am Main (DE); Axel Schardt, Frankfurt am Main (DE)

(73) Assignee: Degussa Bank AG, Frankfurt am Main (DE)

( * ) Notice: Subject to any disclaimer, the term of this patent is extended or adjusted under 35 U.S.C. 154(b) by 0 days.

(21) Appl. No.: 17/368,955

(22) Filed: Jul. 7, 2021

(65) Prior Publication Data

US 2022/0343418 A1     Oct. 27, 2022

(30) Foreign Application Priority Data

Apr. 23, 2021   (EP) .................................... 21170183

(51) Int. Cl.
  *G06F 9/451*       (2018.01)
  *G06F 3/0482*      (2013.01)
  *G06Q 10/10*       (2012.01)

(52) U.S. Cl.
  CPC ............ *G06F 9/451* (2018.02); *G06F 3/0482* (2013.01); *G06Q 10/1095* (2013.01)

(58) Field of Classification Search
  CPC ... G06F 9/451; G06F 3/0482; G06Q 10/1095; G06Q 40/02
  See application file for complete search history.

(56) References Cited

U.S. PATENT DOCUMENTS

| | | | | |
|---|---|---|---|---|
| 8,751,393 | B1* | 6/2014 | Murray | G06Q 40/02 705/42 |
| 2013/0036009 | A1* | 2/2013 | Heiser, II | G06Q 30/0277 705/14.66 |
| 2015/0294405 | A1* | 10/2015 | Hanson | G06Q 40/02 705/42 |
| 2016/0055431 | A1* | 2/2016 | Howe | G06Q 50/14 705/6 |
| 2016/0132847 | A1* | 5/2016 | Sarris | G06Q 20/1085 705/42 |
| 2018/0101894 | A1* | 4/2018 | Markoff | G06Q 30/0639 |
| 2018/0101905 | A1* | 4/2018 | Acharya | G06Q 40/02 |
| 2022/0188130 | A1* | 6/2022 | Woo | G06F 11/0709 |

* cited by examiner

*Primary Examiner* — Jennifer N Welch
*Assistant Examiner* — Kc Chen
(74) *Attorney, Agent, or Firm* — NZ Carr Law Office PLLC (57) ABSTRACT

A technique is provided for providing virtual services. The technique includes generating a virtual environment comprising a plurality of user interface (UI) objects that corresponds to a plurality of services provided by a service provider. The technique further includes rendering the generated plurality of UI objects on an electronic device of a user in a manner to provide a user experience (UX) to the user that emulates a physical experience of the user with the services provider. The technique further includes processing a request received from the user corresponding to a selection of a UI object from the rendered plurality of UI objects. The technique further includes providing a service to the user that corresponds to the selected UI object.

20 Claims, 5 Drawing Sheets

METHOD AND SYSTEM FOR PROVIDING VIRTUAL SERVICES

CROSS REFERENCE TO RELATED APPLICATION

The present application claims priority of European Patent Application No. 21170183.4 filed Apr. 23, 2021. The entire contents of which are hereby incorporated by reference.

FIELD OF THE INVENTION

This disclosure relates generally to providing services, and more particularly to system and method for providing virtual services.

BACKGROUND

Conventionally, providing services (for example, in the banks) require customers to be physically present in the premises of the service provider for availing the services. In particular, when the service provider is a bank, this is mandated because of the sensitivity associated with the financial operations. The customer is mandated to be in the in the premises of the bank so that the identities of the customer can be physically verified. For example, there are certain transactions requiring customers to physically sign documents that are verified on the spot for processing the transaction. This prevents chances of the identities of the customer from being counterfeited and for reducing possibilities of fraudulent transactions.

In certain scenarios, the transactions may involve interaction with plurality of bank executives, which becomes particularly convenient if the customer is physically present within the premises of the bank. In certain other scenarios, the customers may be forced to visit the premises due to lack of knowledge about a banking service. In such scenarios, the customers assume that the concierge services at the premises may provide clarification and allow the customer to submit the request for availing the service immediately after.

With increasing pressure with regards to availability of time, it is becoming increasingly difficult for the customers to carve out time to perform banking. Further, the existing online banking solutions provide a limited application suite and often fail to replicate the banking experience. Furthermore, in order to scale presence in the commercial banking space, it is imperative for the banks to have more physical branches which is not feasible and economically viable at times, especially when dealing with sparse customer base in a particular region.

Therefore, there exists a need to provide a system and/or method that facilitates the banks in providing a digital solution addressing the problems noted above. Such a solution should also simplify the overall banking experience and should be easily accessible while securely and digitally offering the services.

SUMMARY

In one embodiment, a system is disclosed for providing virtual services is disclosed. The system comprises a processor and a memory communicatively coupled to the processor. The memory stores processor-executable instructions, which, on execution, cause the processor to generate a virtual environment comprising a plurality of user interface (UI) objects that corresponds to a plurality of services provided by a service provider. The plurality of services may be categorized in one or more categories, and wherein each of the one or more categories of services is associated with one or more users from the plurality of users. The processor-executable instructions further cause the processor to render the generated plurality of UI objects on an electronic device of a user in a manner to provide a user experience (UX) to the user that emulates a physical experience of the user with the service provider. The plurality of UI objects may be grouped in one or more sections each corresponding to the one or more categories of services. The processor-executable instructions further cause the processor to process a request received from the user corresponding to a selection of a UI object from the rendered plurality of UI objects to determine a service, which is to be provided to the user. The processor-executable instructions further cause the processor to provide the determined service to the user that corresponds to the selected UI object.

In another embodiment, a method of providing virtual services is disclosed. In one example, the method comprises generating, by a virtual services platform, a virtual environment comprising a plurality of user interface (UI) objects that corresponds to a plurality of services provided by a service provider. The plurality of services may be categorized in one or more categories, and wherein each of the one or more categories of services is associated with one or more users from the plurality of users. The method comprises rendering the generated plurality of UI objects on an electronic device of a user in a manner to provide a user experience (UX) to the user that emulates a physical experience of the user with the service provider. The plurality of UI objects may be grouped in one or more sections each corresponding to the one or more categories of services. The method further comprises processing a request received from the user corresponding to a selection of a UI object from the rendered plurality of UI objects to determine a service, which is to be provided to the user. The method further comprises providing the determined service to the user that corresponds to the selected UI object.

In yet another embodiment, a non-transitory computer-readable medium storing computer-executable instructions for providing virtual services is disclosed. In one example, the stored instructions, when executed by a processor, cause the processor to perform operations comprising generating a virtual environment comprising a plurality of user interface (UI) objects that corresponds to a plurality of services provided by a service provider. The plurality of services may be categorized in one or more categories, and wherein each of the one or more categories of services is associated with one or more users from the plurality of users. The operations comprise rendering the generated plurality of UI objects on an electronic device of a user in a manner to provide a user experience (UX) to the user that emulates a physical experience of the user within the service provider. The plurality of UI objects may be grouped in one or more sections each corresponding to the one or more categories of services. The operations further comprise processing a request received from the user corresponding to a selection of a UI object from the rendered plurality of UI objects to determine a service, which is to be provided to the user. The operations further comprise providing the determined service to the user that corresponds to the selected UI object.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Various implementations may be found in a method and/or a system for providing virtual services. The system includes comprises a processor and a memory communicatively coupled to the processor. The memory stores processor-executable instructions, which, on execution, cause the processor to generate a virtual environment comprising a plurality of user interface (UI) objects that corresponds to a plurality of services provided by a service provider. The service provider corresponds to a bank and the plurality of services includes one or more services for providing banking services, one or more services for booking appointment, one or more services for exchange of documents, and one or more services for providing customer support.

The plurality of services may be categorized in one or more categories, and wherein each of the one or more categories of services is associated with one or more users from the plurality of users. In an embodiment, the plurality of UI objects includes UI objects corresponding to a stock price listings, real-time news flashes, advertisements, weather information, listing of banking services provided by the bank, one or more tutorials for availing the listed services, Universal Resource Locator (URLs) corresponding to social networking pages of the bank, and notice board.

The processor-executable instructions further cause the processor to render the generated plurality of UI objects on an electronic device of a user in a manner to provide a user experience (UX) to the user that emulates a physical experience of the user with the service provider. In an embodiment, for enabling booking of an appointment, the processor is configured to render one or more UI objects for selection of a date and time of the appointment, selection of a category of requested service, and selection of an executive from the plurality of executives capable of providing the requested service. The plurality of UI objects may be grouped in one or more sections each corresponding to the one or more categories of services.

The processor-executable instructions further cause the processor to process a request received from the user corresponding to a selection of a UI object from the rendered plurality of UI objects to determine a service, which is to be provided to the user. The processor is configured to generate one or more confirmations corresponding to a booked appointment for providing the requested service from the plurality of services. The processor is further configured to transmit the generated one or more confirmations to the service provider and the user. The processor-executable instructions further cause the processor to provide the determined service to the user that corresponds to the selected UI object.

In an embodiment, the processor is configured to provide a real-time status indicative of an availability of one or more executives from the plurality of executives tasked with providing one or more services from the plurality of services. The plurality of UI objects enable communication between the user and the one or more executives using one or more of: a telephone call, a voice over Internet (VoIP) call, a chat, a video conference, email, a screen-sharing session, a whiteboard, and short messaging service (SMS).

In an embodiment, the processor is configured to provide one or more interface to each executive from the one or more executives for one or more of tracking one or more requests received from a plurality of users corresponding to requested services from the plurality of services; establishing communication with a user from the plurality of users; and generating one or more insights corresponding to the requests serviced by an executive from the one or more executive.

In an embodiment, the processor is further configured to render one or more UI objects to the user for providing feedback corresponding to a service provided to the user by an executive.

Figure 1:
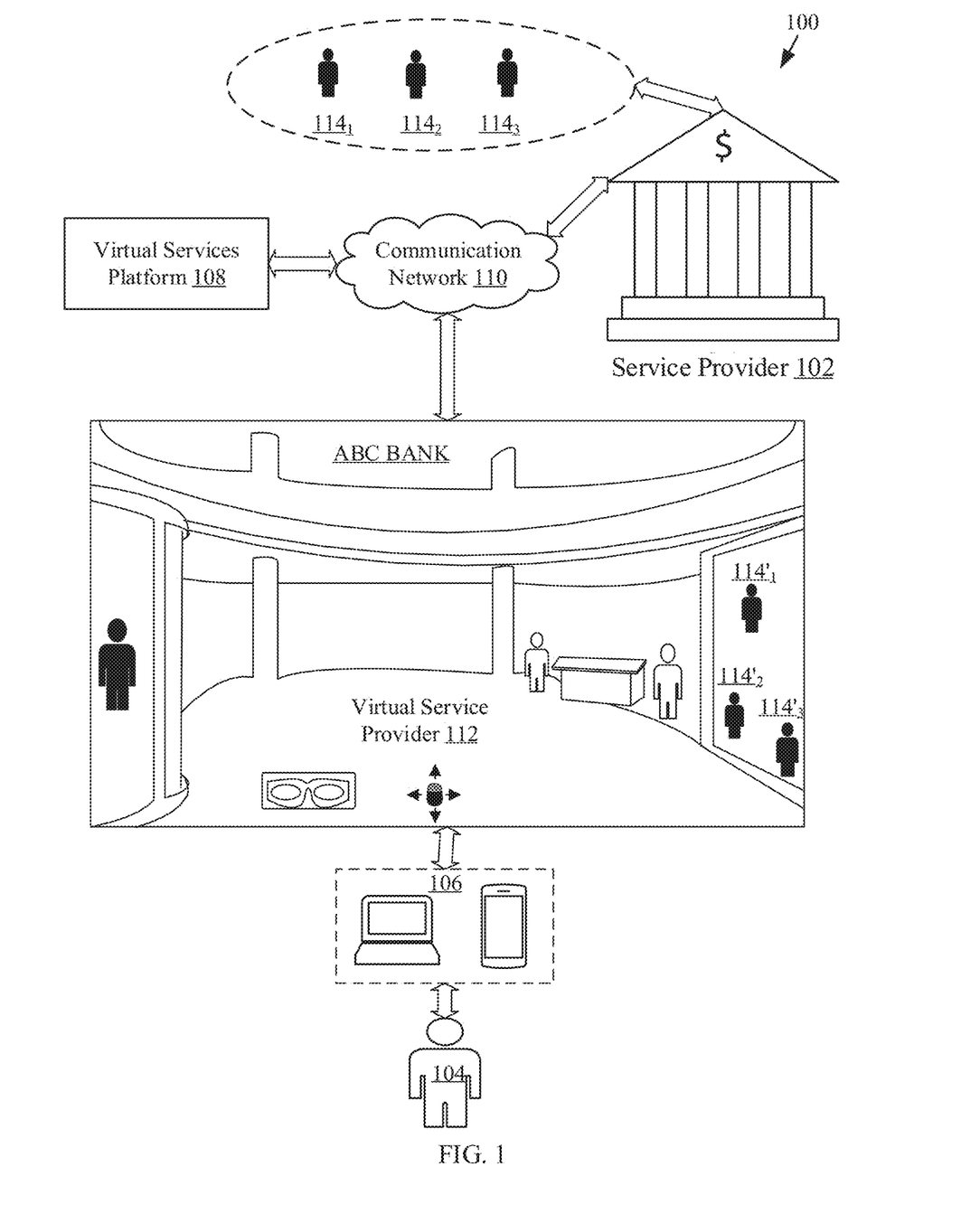
FIG. 1 is a block diagram of an exemplary network environment for providing virtual services, in accordance with some embodiments of the present disclosure.

Referring now to FIG. 1, an exemplary network environment 100 for providing virtual services is illustrated in accordance with some embodiments of the present disclosure. The network environment 100 displays a service provider 102, a user 104 from the plurality of users (not shown), electronic device 106, and a virtual services platform 108. The service provider 102, the user 104, the electronic device 106, and the virtual services platform 108 may be communicatively coupled with each other via the communication network 110. In an implementation, the network environment 100 may further include a virtual service provider 112 that may be generated by the virtual services platform 108 and may be rendered on the electronic device 106. A person of ordinary skill in the art will appreciate that for the purpose of illustration, only one user is depicted. However, the virtual bank 112 may be accessed by a plurality of other users on the associated electronic devices, without limiting the scope of this disclosure.

The service provider 102 may correspond to a financial institution engaging in providing banking services that include, but are not limited to, a bank providing commercial banking services, loans, mortgages, merchant services, treasury services, foreign exchange services, financial counselling and consulting, and the like. For the sake of explanation, the service provider 102 will be referred as bank 102, the virtual services platform 108 will be referred as virtual banking platform 108, and the virtual service provider 112 will be referred as virtual bank 112, hereinafter in the following disclosure.

The services may be offered by a plurality of executives 114 ($114_1$ to $114_n$) enrolled with the bank. The services may be availed by a plurality of users (such as the user 104) by registering with the bank 102. Such availing of the services may be performed remotely by the user 104 by leveraging the virtual banking platform 108 that is configured to generate a virtual environment 100 of the bank in the form of a virtual bank 112. The virtual bank 112 may include virtual representations of the plurality of executives 114, depicted as plurality of executives 114' ($114'_1$ to $114'_n$). The virtual bank 112 may be rendered by the virtual banking platform 108 on the electronic device 106 associated with the user 104.

The electronic device 106 associated with a user 104 may include suitable logic, circuitry, interfaces, and/or code for displaying one or more user interfaces (UI) of the virtual bank 112 generated by the virtual banking platform 108 on a display screen of the electronic device. Examples of implementation of the display screen of the electronic devices may include, but are not limited to, a Liquid Crystal Display (LCD) display, a Light Emitting Diode (LED) display, an Organic LED (OLED) display technology.

The communication network 110 may include a medium through which the bank 102, the user 104, the electronic device 106, and the virtual banking platform 108 present in the network environment 100, may communicate with each other. Examples of the communication network 108 may include, but are not limited to, the Internet, a cloud network, a Wireless Fidelity (Wi-Fi) network, a Wireless Local Area Network (WLAN), a Local Area Network (LAN), a telephone line (POTS), Long Term Evolution (LTE), and/or a Metropolitan Area Network (MAN). Various devices in the exemplary network environment 100 may be configured to connect to the communication network 110, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE® 802.11, 802.16, cellular communication protocols, and/or Bluetooth® (BT) communication protocols.

In operation, the virtual banking platform 108 may generate a virtual bank environment comprising a plurality of UI objects that corresponds to a plurality of services and/or the plurality of executive 114 enrolled with the bank 102. In an embodiment, the plurality of UI objects includes UI objects corresponding to a stock price listings, real-time news flashes, advertisements, weather information, listing of banking services provided by the bank, one or more tutorials for availing the listed services, URLs corresponding to social networking pages of the bank, and notice board. In another embodiment, the plurality of UI objects includes UI objects corresponding to one or more games oriented towards learning and/or entertainment of the users. The one or more games may be customized in a manner to enhance the financial knowledge of the users. The one or more games may further be customized in a manner to enhance the knowledge regarding the banking processes. Such games may include, but are not limited to, one or more puzzles, crosswords, a hide-and-seek game, a Christmas calendar, and the like.

In an embodiment, the plurality of services includes one or more services for providing banking services, one or more services for booking appointment, one or more services for exchange of documents, and one or more services for providing customer support. The plurality of services may be categorized in one or more categories, and wherein each of the one or more categories of services is associated with one or more users from the plurality of users.

The virtual services platform 108 may render the generated plurality of UI objects on an electronic device 106 of the user 104. The generated plurality of UI objects may be rendered in a manner that emulates a physical experience of the user within the premises of the bank 102. In other words the arrangement of the UI objects on the UI may be such that user 104 may be able to intuitively navigate a virtual space depicted as the virtual bank 112 on the electronic device 106. The plurality of UI objects may be grouped in one or more sections each corresponding to the one or more categories of services. In an embodiment, when the electronic device 112 supports 3-dimensional (3-D) rendering and devices such as 3-D glasses, the experience of the user 104 emulates the actual 3-D experience of the user when it is physically present in the premises of the bank 102.

In an embodiment, the virtual banking platform 108 may render one or more suitable UI objects enabling activities that include, but are not limited to, booking of an appointment, selection of a date and time of the appointment, selection of a category of requested service, and selection of an executive from the plurality of executives 114' capable of providing the requested service.

The virtual banking platform 108, via the electronic device 106 of the user 104, may receive one or more request from the user 104. The request may correspond to a selection input received on one or more UI objects rendered on the electronic device 106. The selection may be performed to expand a list of options available in a category, or to specifically select a service. In response to the received selection of a UI object, the virtual banking platform 108 may prompt the user 104 to finalize a schedule for availing the requested service.

In an embodiment, the virtual banking platform 108 may categorize services into those that can be provided without human intervention and those that involve human intervention. For services that require human intervention, for a service, which is to be availed by the user 104, the virtual banking platform 108 may present a list of executives (from the plurality of executives 114') that may service the request. To this end, the virtual banking platform 108 may provide a real-time status indicative of an availability of the listed executives. Upon receiving the selection corresponding to a chosen executive for servicing the request, the virtual banking platform 108 may generate one or more confirmations corresponding to an appointment booked with the executive. Further, the virtual banking platform 108 may transmit the generated one or more confirmations to the selected executive and the user 104.

In another embodiment, the virtual banking platform 108 may receive a preferred timeslot from the user 104 for availing a service. Based on the received preferred timeslot, the virtual banking platform 108 may correlate the availability of an executive who can service the request and accordingly, automatically book the appointment of the user 104 with the executive. The virtual banking platform 108 may generate one or more confirmations corresponding to the automatically booked appointment and may transmit the generated one or more confirmations to the selected executive and the user 104.

In an embodiment, the virtual banking platform 108 may provide one or more interface to each executive from the plurality of executives 114'. The interface may enable the executives in tracking one or more requests received from a plurality of users. The interface may further enable the executives in establishing communication with a user from the plurality of users. The interface may further enable the executives in generating one or more insights and create configurable dashboards corresponding to the requests serviced by an executive from the one or more executive. In another embodiment, the virtual banking platform 108 may generate an interface for an administrator of the virtual bank 112. Such an at interface may provide a consolidated view to the administrator of the virtual bank 112 with regards to data that includes, but is not limited to, availability of the executives, utilization of the executives, category-wise performance metrics of executives.

In an embodiment, the virtual banking platform 108 may generate one or more reminders to alert the user 104 and the executive a pre-defined number of days in advance of the date of the appointment. In an embodiment, the virtual banking platform 108 may enable the user 104 to change the pre-defined number of days described above along with the number of such reminders that are to be generated.

On the approach of the booked timeslot for availing the service, the virtual banking platform 108 may present one or more UI objects that enable communication between the user 104 and the executive. The one or more such UI objects enable communication via modes that may include, but are not limited to, a telephone call, a voice over Internet (VoIP) call, a chat, a video conference, email, a screen-sharing session, a whiteboard, and short messaging service (SMS).

In an embodiment, the virtual banking platform 108 may render one or more UI objects to the user for providing feedback corresponding to a service provided to the user 104 by an executive. The collected feedback may be used by the virtual banking platform 108 in analyzing the performance of the executives. In an embodiment, the virtual banking platform 108 may further generate category-wise ratings based on the feedback. The ratings may be rendered on the electronic device 106 at the time of booking a service. The ratings may further be used by the virtual banking platform 108 in providing incentives to the executives.

For services that do not require human intervention, the virtual banking platform 108 may provide a service to the user 104 that corresponds to the selected UI object by the user 104.

It should be noted that the various components of the system disclosed above may be implemented in programmable hardware devices such as programmable gate arrays, programmable array logic, programmable logic devices, and so forth. Alternatively, the various modules described above may be implemented in software for execution by various types of processors. An identified module of executable code may, for instance, include one or more physical or logical blocks of computer instructions which may, for instance, be organized as an object, procedure, function, engine, or other construct. Nevertheless, the executables of an identified module need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for transmitting data over a communication network 110. For example, the exemplary network environment 100 may transmit data over a communication network 110 by the processes discussed herein. In particular, as will be appreciated by those of ordinary skill in the art, control logic and/or automated routines for performing the techniques and steps described herein may be implemented by the network environment 100, either by hardware, software, or combinations of hardware and software. For example, suitable code may be accessed and executed by the one or more processors on the network environment 100 to perform some or all of the techniques described herein. Similarly, application specific integrated circuits (ASICs) configured to perform some or all of the processes described herein may be included in the one or more processors on the network environment 100.

Figure 2:
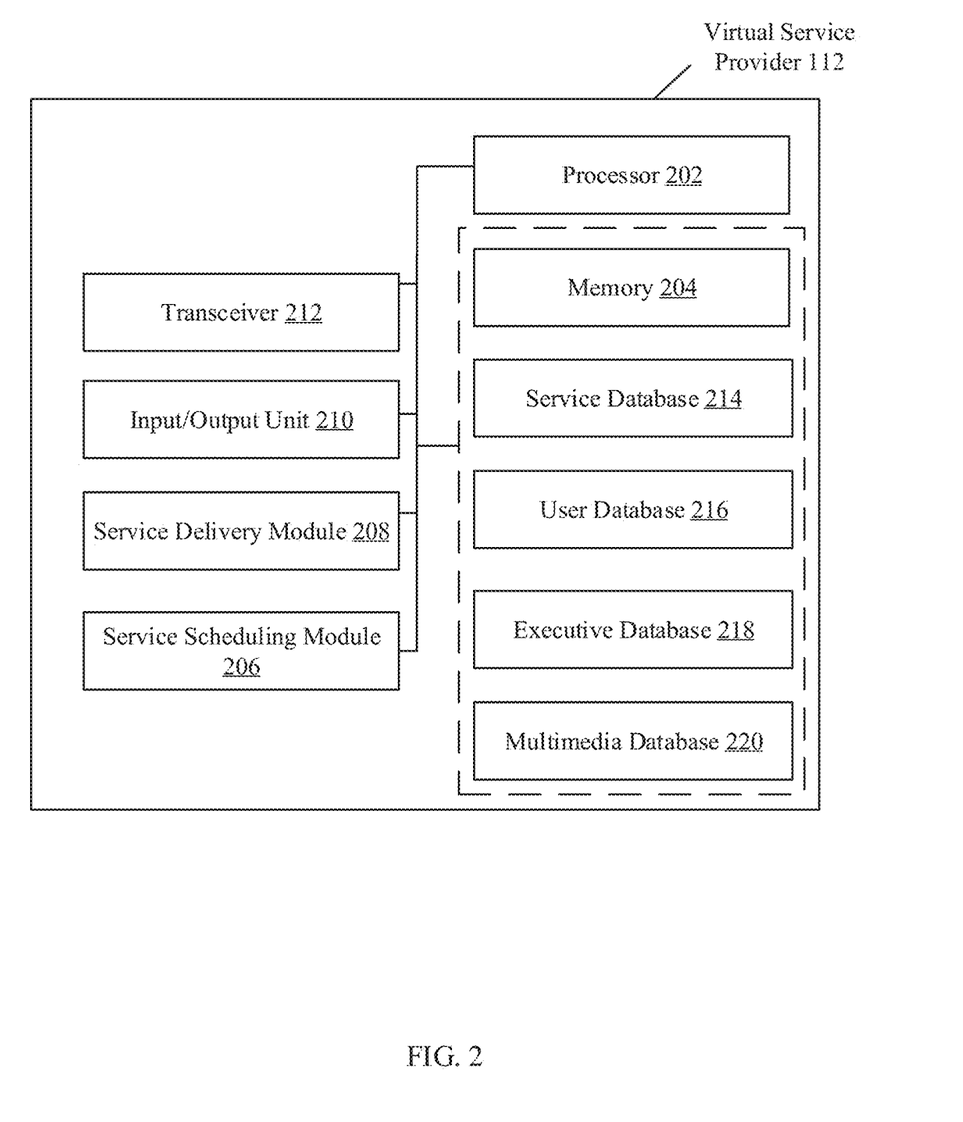
FIG. 2 is a block diagram of exemplary system for providing virtual services, in accordance with some embodiments of the present disclosure.

FIG. 2 is a block diagram of exemplary system for providing virtual services by the virtual services platform 112, in accordance with some embodiments of the present disclosure. FIG. 2 is explained in conjunction with elements from FIG. 1. With reference to FIG. 2, there is shown the virtual services platform 112 that may include one or more processors, such as a processor 202, a memory 204, a service scheduling module 206, a service delivery module 208, an input/output (I/O) module 210, and/or a transceiver 212. In an implementation, the memory 204 may include a plurality of databases that may be integrated into the memory 204. The databases may include a services database 214, an executive database 216, a user database 218, and/or a multimedia database 220. The processor 202 may be communicatively coupled to the memory 204, the service scheduling module 206, the service delivery module 208, the I/O module 210, and/or the transceiver 212.

The processor 202 may include suitable logic, circuitry, interfaces, and/or code that may be configured to execute a set of instructions stored in the memory 204. The processor 202 may be configured to generate a virtual environment 100 of the bank 102. The processor 202 may be further configured to receive request for availing services from the user 104 and may coordinate the executives 114 to service the request. To this end, the processor 202 may correlate the availability of the executives with the preferred schedule for availing the service. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 204 may include suitable logic, circuitry, and/or interfaces that may be configured to store a machine code and/or a computer program with at least one code section executable by the processor 202. Examples of implementation of the memory 204 may include, but are not limited to, Random Access Memory (RAM), Read Only Memory (ROM), Hard Disk Drive (HDD), and/or a Secure Digital (SD) card.

In an implementation, the memory 204 may be integrated with the plurality of databases, such as the services database 214, the executive database 216, the user database 218, and/or the multimedia database 220. The services database 214 may be configured to store the details of the banking services offered by the bank 102 via the virtual bank 112. The executive database 216 may be configured to store the details of the plurality of executives 114 registered with the bank 102 for providing the banking services, via the virtual bank 112. The executive database 216 may be further configured to store the relationship between a registered executives and the one or more service that may be offered by the executive. The user database 218 may be configured to store the details of the plurality of users that register with the bank 102 for availing the banking services offered by the bank 102 via the virtual bank 112. The multimedia database 220 may be configured to store multimedia content that may be rendered in the display zone of the virtual bank 112. Such data may include, but is not limited to, a stock price listings, real-time news flashes, advertisements, weather information, listing of banking services provided by the bank, one or more tutorials for availing the listed services, Universal Resource Locator (URLs) corresponding to social networking pages of the bank, and notice board. A person of ordinary skill in the art will appreciate that the data stored in the databases described above may be stored in a structured or an unstructured data format. Examples of implementation of the databases described above may include, but are not limited to, secure databases such as Amazon Web Services Cloud (AWS®), Microsoft Azure®, Cosmos DB®, Oracle® Database, Sybase®, MySQL®, Microsoft Access®, Microsoft SQL Server®, FileMaker ProTM, and dBASE®. A person of ordinary skill in the art will appreciate that in an alternate implementation, the databases described above may be implemented as an entity that is separate from the memory 204, without limiting the scope of this disclosure.

The service scheduling module 206 may include suitable logic, circuitry, interfaces, and/or code that may be configured to provide the necessary UI objects to the users on the interface of the virtual bank 112, to facilitate the selection of a preferred schedule for availing one or more services offered by the bank 102. The service scheduling module 206 may be implemented based on technologies that include, but are not limited to, Luware®, Genesys cloud®, CloudTalk®, Office 365® application suite (such as Teams, Bookings, Forms, Sharepoint, etc.).

The service delivery module 208 may include suitable logic, circuitry, interfaces, and/or code that may be configured to provide the necessary applications to the executives and the users to transactions facilitating exchange of services, via the virtual bank 112. The service delivery module 208 may be implemented based on technologies that include, but are not limited to, Luware®, Genesys cloud®, CloudTalk®, Office 365® application suite (such as Teams, Bookings, Forms, etc.).

The I/O module 210 may include suitable logic, circuitry, interfaces, and/or code that may be configured to render, to the UI objects generated by the processor 202 on the electronic devices of the users and the executives. The I/O module 210 may include various input and output devices that may be configured to facilitate the communication between the plurality of executives and the users via the virtual bank 112. In an implementation, the services of the bank 102 may be offered via the virtual bank 112, based on one or more electronic devices (such as the electronic device 106) associated with the users (such as the user 104). It is such one or more electronic devices that, in conjunction with the I/O module 210, may be configured to display one or more interfaces of the virtual bank 112. The I/O module 210 may further facilitate generation and rendering of interfaces on the electronic devices associated with the plurality of executives 114. Examples of the display screen 212a may include, but are not limited to, Liquid Crystal Display (LCD) display, Light Emitting Diode (LED) display, Organic LED (OLED) display technology, and/or the like.

In an implementation, the I/O module 210 may be further equipped with a photographic optical system, such as a photographic lens and/or a zoom lens, as well as one or more image sensors, such as a charge-coupled device (CCD) or a complementary metal-oxide-semiconductor (CMOS), a digital camera, a camera embedded in a personal digital assistant (PDA), a video camera, and/or a motion camera. A person of ordinary skill in the art will appreciate that the I/O module 210 may further include one or more audio based output devices for enabling communication with a user and an executive.

The transceiver 212 may include suitable logic, circuitry, interfaces, and/or code that may be configured to facilitate communication among the plurality of users and the plurality of executives 114. The transceiver 212 may be implemented based on known technologies to support wired or wireless communication. The transceiver 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 212 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM®), Enhanced Data GSM Environment (EDGE®), wideband code division multiple access (W-CDMA®), code division multiple access (CDMA®), Long Term Evolution (LTE®), time division multiple access (TDMA), Bluetooth®, Wireless Fidelity (Wi-Fi®) (such as IEEE® 802.11a, IEEE® 802.11b, IEEE 802.11g and/or IEEE® 802.11n), voice over Internet Protocol (VoIP®), Wi-MAX®, a protocol for email, instant messaging, and/or Short Message Service (SMS).

In operation, the processor 202 in conjunction with the I/O module 210 may be configured to may generate a virtual bank environment (referred as virtual bank 112 hereinafter) of the bank 102. The virtual bank 112 may include a plurality of user interface (UI) objects that corresponds to a plurality of services and/or the plurality of executive 114 enrolled with the bank 102. The plurality of services may be categorized in one or more categories, and wherein each of the one or more categories of services is associated with one or more users from the plurality of users. In an embodiment, the plurality of services includes one or more services for providing banking services, one or more services for booking appointment, one or more services for exchange of documents, and one or more services for providing customer support. To this end, the processor 202 may refer to the services database 214 and the executive database 216 of the memory 204.

The processor 202, in conjunction with the memory 204 may be configured to determine an association of an executive (such as the executive 1141) with one or more services using the aforementioned database. Such an association may be indicative of the capability of the executive 1141 in servicing the requests relating to the one or more services. The processor 202 may be configured to tag each of the plurality of executives 114 with an associated service. While generating the plurality of UI objects of the virtual bank 112, the processor 202 may be configured to cluster the plurality of executives 114' to be displayed on the virtual bank 112, in accordance with the tagging. For example, the executives tagged to "cashier service" may be displayed in a separate UI object cluster, when compared to the executives tagged to "loan services".

In an embodiment, the processor 202, in conjunction with the multimedia database 220, may be configured to generate a plurality of UI objects that may be generated for displaying the multimedia content on the virtual bank 112. Such UI objects may include UI objects corresponding to stock price listings, real-time news flashes, advertisements, weather information, listing of banking services provided by the bank, one or more tutorials for availing the listed services, URLs corresponding to social networking pages of the bank, and notice board. In another embodiment, the plurality of UI objects may further include UI objects corresponding to one or more games for entertainment of the plurality of users. Such games may include, but are not limited to, one or more puzzles, crosswords, a hide-and-seek game, a Christmas calendar, and the like.

The processor 202, in conjunction with the I/O module, may be configured to display the aforesaid UI objects in a pre-defined section of the interface of the virtual bank 112. The aforesaid UI objects may supplement the UI objects that facilitate the consumption of the services offered by the bank 102.

The processor 202, in conjunction with the I/O module 210, may be configured to render the generated plurality of UI objects on an electronic devices of the users (such as the electronic device 106 of the user 104). The processor 202, in conjunction with the I/O module 210 may be configured to ensure that the generated plurality of UI objects may be rendered in a manner that emulates a physical experience of the user within the premises of the bank 102. In an embodiment, the processor 202 may be configured to allow an administrator of the bank 102 to define a layout of an interface of the virtual bank 112. To this end, the I/O module 210 may provide one or more tools to the administrator to delegate spaces in the layout of the virtual bank 112. The spaces may be allocated for the plurality of services offered by the bank 102 based on the category. Further, the processor 202 may be configured to determine the executives associated with the services and accordingly in conjunction with the spaces may also be filled with the UI objects that correspond to the plurality of executives 114 (and the virtual representation thereof).

In other words the arrangement of the UI objects on the UI may be such that user 104 may be able to intuitively navigate a virtual space depicted as the virtual bank 112 on the electronic device 106. In an embodiment, when the electronic device 112 supports 3-dimensional (3-D) rendering and devices such as 3-D glasses (or smart glasses), the experience of the user 104 emulates the actual 3-D experience of the user when it is physically present in the premises of the bank 102. The I/O module 210 may support the 3-D rendering of the virtual bank 112 when viewed via glasses that include, but are not limited to, Google Glass®, Microsoft HoloLens®, Airscouter®, Iristick.Z1®.

In an embodiment, the processor 202, in conjunction with the I/O module 210 may be configured to render one or more suitable UI objects that enable activities that include, but are not limited to, selection of a category of requested service, booking of an appointment for a requested service, selection of a date and time of the appointment, and selection of an executive from the plurality of executives 114' capable of providing the requested service.

The processor 202, in conjunction with the transceiver 212, may be configured to receive one or more request from the user 104 provided on the electronic device 106. The request may correspond to a selection input received on one or more UI objects rendered by the I/O module 210 on the electronic device 106. In an embodiment, the selection may be performed to expand a list of options available in a category, or to specifically select a service. In response to the received selection of a UI object, the processor 202 may be configured to prompt the user 104 to finalize a schedule for availing the requested service.

In an embodiment, the processor 202, in conjunction with the services database 214, may be configured to categorize services into those that can be provided without human intervention and those that involve human intervention. In an embodiment, the categorization may be performed automatically by use of one or more machine learning algorithms. In another embodiment, processor 202 may prompt an administrator deputed by the bank 102 for completing the categorization.

In an embodiment, for services that require human intervention, the processor 202, in conjunction with the I/O module 210, may be configured to present a list of executives (from the plurality of executives 114') that may service the request. To this end, the processor 202 may be configured to provide a real-time status indicative of an availability of the listed executives. Upon receiving the selection corresponding to a chosen executive for servicing the request, the processor 202 may be configured to generate one or more confirmations corresponding to an appointment booked with the executive. Further, the processor 202, in conjunction with the transceiver 212, may be configured to transmit the generated one or more confirmations to the selected executive and the user 104.

In another embodiment, the processor 202, in conjunction with the service scheduling module 206, may be configured to receive a preferred timeslot from the user 104 for availing a service. To this end, the processor 202, in conjunction with the I/O module 210, may be configured to render one or more UI objects that enable the user 104 to select a preferred date, time, and day for availing the service. Based on the received preferred timeslot, the processor 202 may be configured to correlate the availability of an executive who can service the request and accordingly, automatically book the appointment of the user 104 with the executive. The processor 202 may be further configured to generate one or more confirmations corresponding to the automatically booked appointment and may transmit the generated one or more confirmations to the selected executive and the user 104.

In an embodiment, the processor 202 may be configured to provide one or more interface to each executive from the plurality of executives 114 (and virtual representation thereof). The interface may enable the executives in tracking one or more requests received from a plurality of users, generating one or more insights as discussed in detail in FIG. 1.

In an embodiment, the processor 202, in conjunction with the service scheduling module 206 and the transceiver 212, may be configured to generate one or more reminders to alert the user 104 and the executive a pre-defined number of days in advance of the date of the appointment. In an embodiment, the processor 202 may be configured to enable the user 104 to change the pre-defined number of days described above along with the number of such reminders that are to be generated. Further, the processor 202 in conjunction with the service delivery module 208, may be configured to provide the requested service to the user 104.

In an embodiment, upon the approach of the booked timeslot for availing the service, the processor 202 in conjunction with the I/O module 210, may be configured to, present one or more UI objects that enable communication between the user 104 and the executive. The one or more such UI objects enable communication via modes that may include, but are not limited to, a telephone call, a voice over Internet (VoIP) call, a chat, a video conference, email, a screen-sharing session, a whiteboard, and short messaging service (SMS).

In an embodiment, the processor 202 may be configured to render one or more UI objects to the user for providing feedback corresponding to a service provided to the user 104 by an executive. The collected feedback may be used by the virtual banking platform 108 in analyzing the performance of the executives. In an embodiment, the processor 202 may be further configured to generate category-wise ratings based on the feedback. The ratings may be rendered on the electronic device 106 at the time of booking a service.

For services that do not require human intervention, the processor 202 may be configured to automatically provide a service to the user 104 that corresponds to the selected UI object by the user 104.

Figure 3:
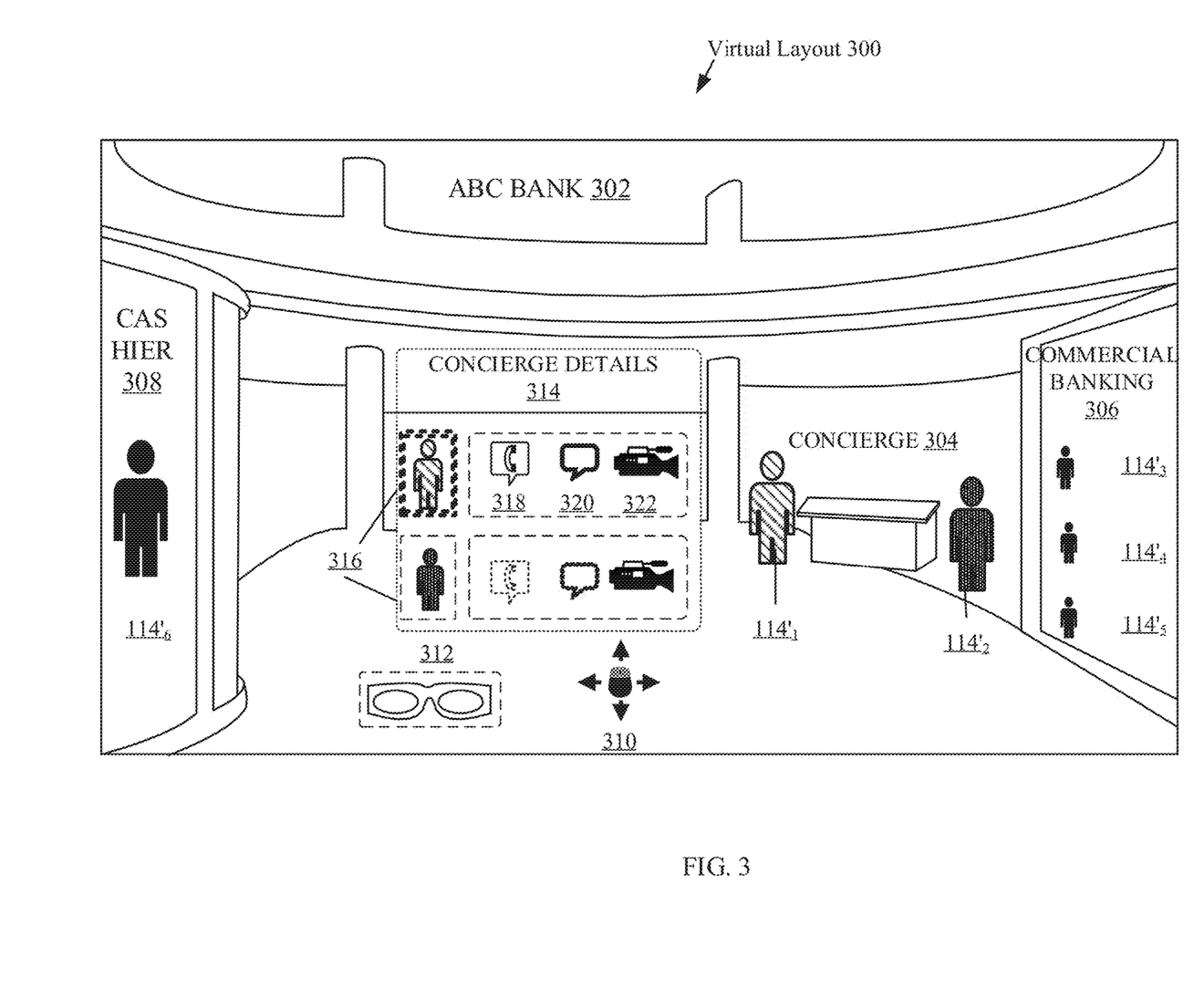
FIG. 3 illustrates an exemplary layout of the virtual bank, in accordance with some embodiments of the present disclosure.

FIG. 3 illustrates an exemplary layout of the virtual bank, in accordance with some embodiments of the present disclosure. The elements of FIG. 3 have been described in conjunction with elements of FIGS. 1 and 2.

With reference to FIG. 3, there is shown an exemplary virtual layout 300 of the bank 102. The exemplary virtual layout 300 of the virtual bank 112 includes an exemplary bank 102 (such as the bank "ABC"). The processor 202 may be configured to provide an option to an administrator of the bank to customize the layout using the logo 302 of the bank.

Further, the virtual layout 300 includes a plurality of UI objects corresponding to the plurality of services offered by the bank 102. In an exemplary scenario, the services offered by the bank may include concierge services denoted using UI object 304, commercial banking services denoted using UI object 306, and cashier services denoted using UI object 308. Furthermore, the bank 102 may depute a plurality of executives for providing each of the services described above. For example, the executives $114_1$ to $114_3$ may be deputed to provide concierge services 304. In the virtual layout 300, the executives $114_1$ to $114_2$ may be denoted by UI objects $114'_1$ to $114'_2$. Similarly, the executives $114_3$ to $114_5$ may be deputed to provide commercial banking services 306. In the virtual layout 300, the executives $114_3$ to $114_5$ may be denoted by UI objects $114'_3$ to $114'_5$. On similar lines, the executive $114_6$ may be deputed to provide cashier services 308. In the virtual layout 300, the executive $114_6$ may be denoted by UI object $114'_6$.

The virtual layout 300 further includes a plurality of UI objects that enable the user 104 to traverse various sections of the layout by interacting with the UI object 310 that assists in navigation. Additionally, for providing a 3-D UX, the processor 202 may further provide a UI object 312 that enables a user to interact with a 3-D version of the virtual layout 300 (as explained in FIGS. 1 and 2).

In an exemplary scenario, when the user 104 selects the concierge service 304, the processor 202 is configured to display the details of the concierge service and the executives enlisted to provide concierge services. As depicted in the FIG. 3, the exemplary virtual layout 300 further depicts concierge details 314 that are displayed to the user on the electronic device 106. The details may delineate the status of the executives via UI object 316. As can be seen from the virtual layout 300, the executives that is available to provide service or is online (executive $114'_1$) is depicted in doubly highlighting whereas the executive $114'_2$ that is offline is depicted in single dotted box.

In an exemplary scenario, the virtual layout further displays UI objects 318, 320, and 322 that correspond to the options for establishing a phone, chat, and video based communication between the user 104 and the executives $114'_1$ and $114'_2$. Similar to the delineated depiction of the online status of the concierge executives, the UI objects 318, 320, and 322 may be separately highlighted for the executives depending on their online statuses. For executive $114'_1$ that may be online, the UI objects 318, 320, and 322 are depicted using solid lines, whereas for the executive $114'_1$ that may be online, the UI objects 318, 320, and 322 are depicted using dotted line.

Figure 4:
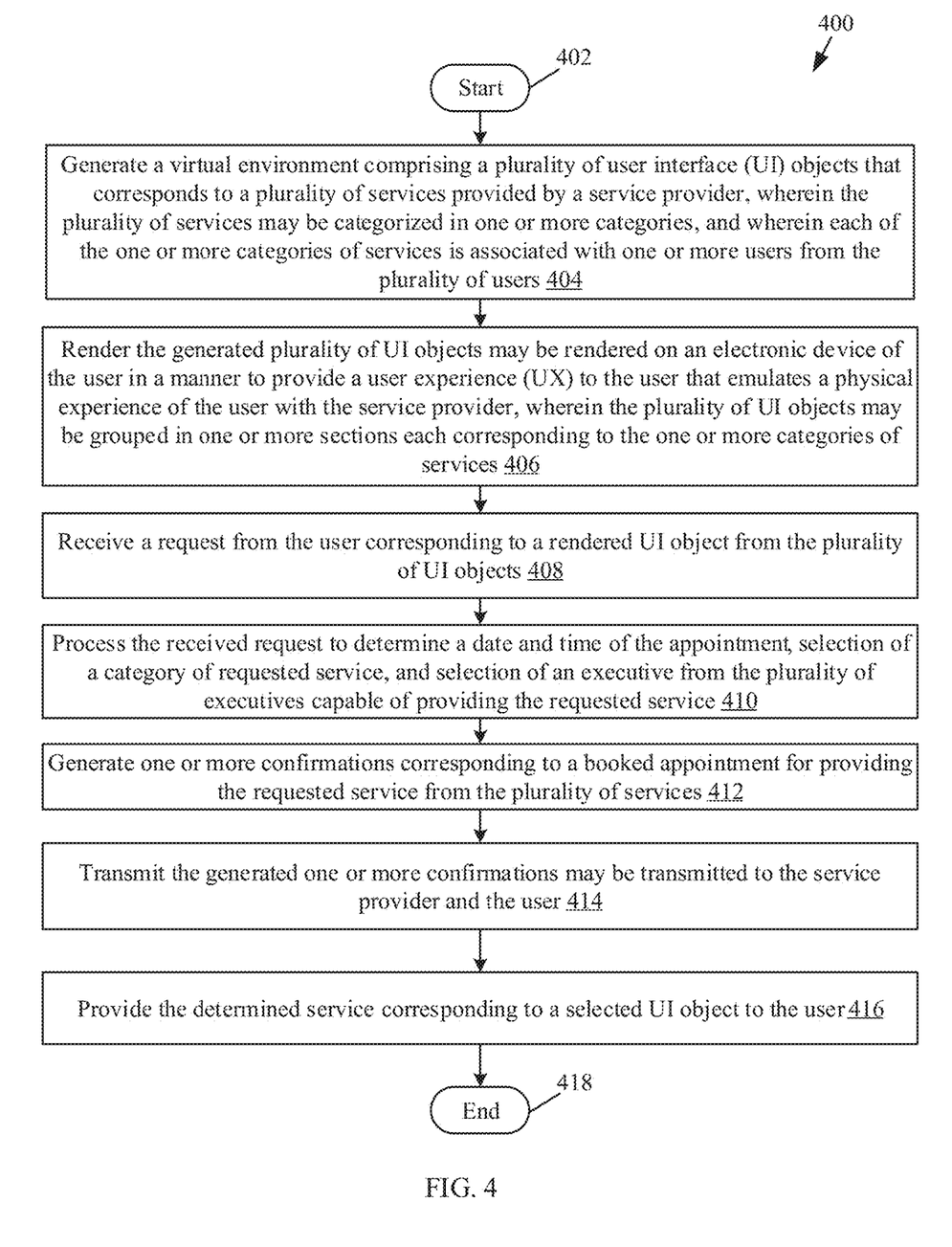
FIG. 4 is a flow diagram of a detailed exemplary process for providing services, in accordance with some embodiments of the present disclosure.

FIG. 4 is a flow diagram of a detailed exemplary process for providing services, in accordance with some embodiments of the present disclosure. With reference to FIG. 4, there is shown a flow chart 400. The flow chart 400 is described in conjunction with FIGS. 1 to 3. The process starts at step 402 and proceeds to step 404.

At step 404, a virtual environment 100 comprising a plurality of user interface (UI) objects that corresponds to a plurality of services provided by a service provider may be generated. The plurality of services may be categorized in one or more categories, and wherein each of the one or more categories of services is associated with one or more users from the plurality of users. The service provider may correspond to a bank and the plurality of services may include one or more services for providing banking services, one or more services for booking appointment, one or more services for exchange of documents, and one or more services for providing customer support. The plurality of UI objects includes UI objects corresponding to a stock price listings, real-time news flashes, advertisements, weather information, listing of banking services provided by the bank, one or more tutorials for availing the listed services, Universal Resource Locator (URLs) corresponding to social networking pages of the bank, and notice board. In another embodiment, the plurality of UI objects includes UI objects corresponding to one or more games for entertainment of the users. Such games may include, but are not limited to, one or more puzzles, crosswords, a hide-and-seek game, a Christmas calendar, and the like.

At step 406, the generated plurality of UI objects may be rendered on an electronic device 106 of the user 104 in a manner to provide a user experience (UX) to the user that emulates a physical experience of the user with the service provider. The plurality of UI objects may be grouped in one or more sections each corresponding to the one or more categories of services. At step 408, a request may be received from the user 104 corresponding to a rendered UI object from the plurality of UI objects. At step 410, the received request may be processed to determine a date and time of the appointment, selection of a category of requested service, and selection of an executive from the plurality of executives capable of providing the requested service.

At step 412, one or more confirmations may be generated corresponding to a booked appointment for providing the requested service from the plurality of services. At step 414, the generated one or more confirmations may be transmitted to the service provider and the user. At step 416, corresponding to a selected UI object, the requested service may be provided to the user. The control passes to end step 418.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
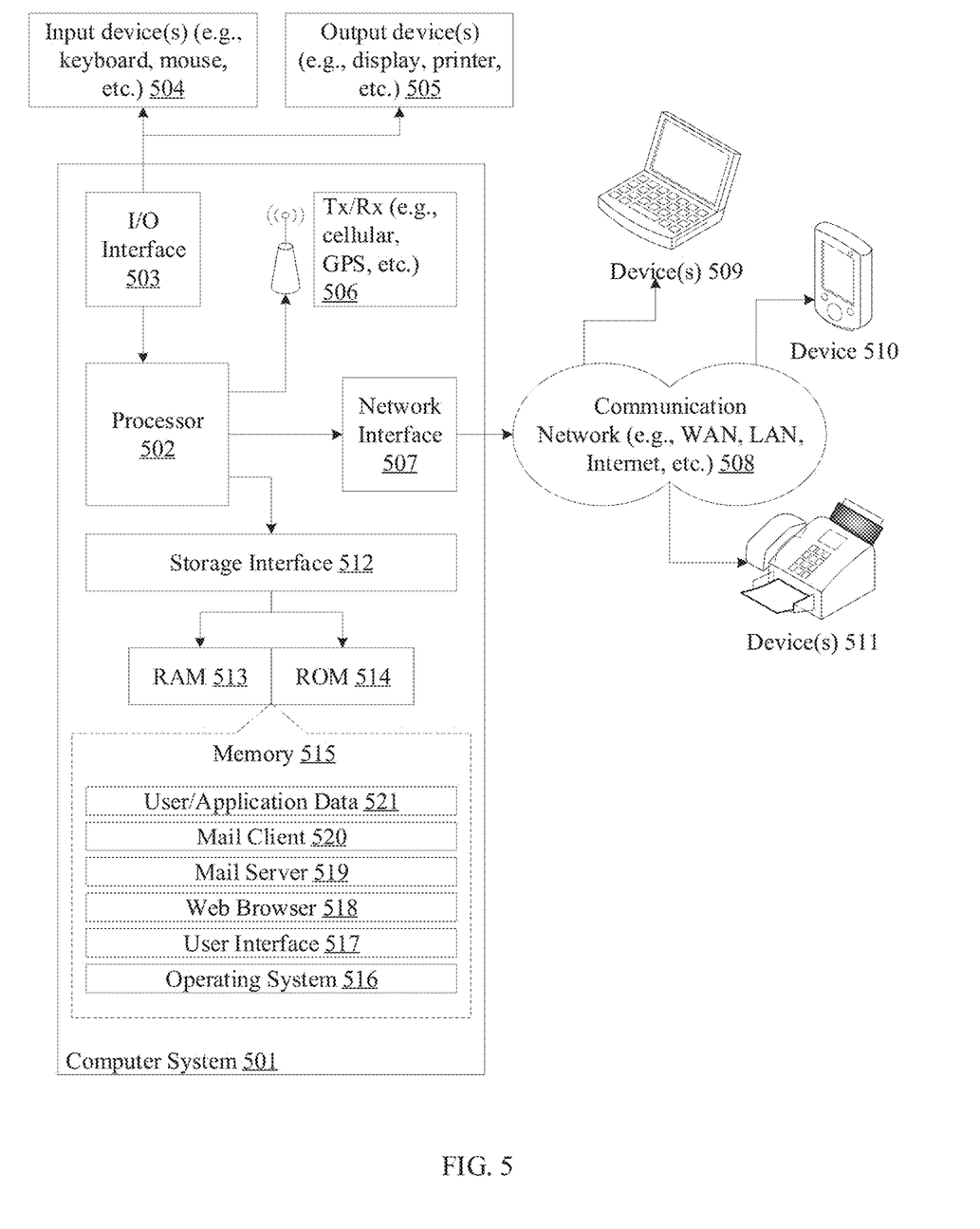
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing network environment 100 for transmitting data over a communication network 108. Computer system 501 may include a central processing unit ("CPU" or "processor") 502. Processor 502 may include at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver 506 may facilitate various types of wireless transmission or reception. For example, the transceiver 506 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., past ticket repository, keywords, Ngrams, clusters or categories, relationship mapping, user queries, resolutions, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectS tore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide a playful, interactive, and graphical interface in a way that the website provides a significantly immersive and an interactive banking experience when compared to internet banking. Further, owing to the intuitive nature of the interfaces, the entry barriers for prospective and existing customers for using the technology is low thereby making the solution publicly accessible. Further, when compared to internet banking, the proposed invention enables the users to enter into directly interact with bank executives by selecting a best suited executive to provide a service. The proposed embodiment further provides a customizable solution whereby different organizations may generate a customized layout. Furthermore, the proposed embodiments provide an integrated platform whereby a user can select a preferred mode of communication with the executives.

The specification has described system and method for providing virtual services. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

The invention claimed is:

1. A system for providing virtual services, the system comprising:
   a processor; and
   a memory storing instructions for execution by the processor, wherein the processor is configured by the instructions to:
   generate a virtual environment comprising a plurality of user interface (UI) objects that corresponds to a plurality of services provided by a service provider, wherein the plurality of services are categorized in one or more categories, and wherein each of the one or more categories of services is associated with one or more users from a plurality of users;
   tag a plurality of executives capable of servicing an associated service from the plurality of services while generating the plurality of UI objects of the virtual environment, wherein the plurality of executives is clustered into a separate UI object cluster of the plurality of the UI objects to be displayed in the virtual environment based on the tagging;
   render the generated plurality of UI objects to navigate a virtual space on an electronic device of a user in a manner to provide a user experience (UX) to the user that emulates a physical experience of the user with the service provider, wherein the plurality of UI objects are grouped in one or more sections each corresponding to the one or more categories of services;
   process a request received from the user corresponding to a selection of a UI object from the rendered plurality of UI objects to determine a service which is to be provided to the user; and
   provide the determined service to the user that corresponds to the selected UI object.

2. The system of claim 1, wherein the service provider corresponds to a bank and the plurality of services comprise one or more services for providing banking services, one or more services for booking appointment, one or more services for exchange of documents, and one or more services for providing customer support.

3. The system of claim 2, wherein the plurality of UI objects comprises UI objects corresponding to a stock price listings, real-time news flashes, advertisements, weather information, listing of banking services provided by a bank, one or more tutorials for availing the listed services, Universal Resource Locator (URLs) corresponding to social networking pages of the bank, and notice board.

4. The system of claim 2, wherein for enabling booking of an appointment, the processor is configured to render one or more UI objects for: selection of a date and time of the appointment, selection of a category of requested service, and selection of an executive from a plurality of executives capable of providing the requested service.

5. The system of claim 2, wherein the processor is configured to:
generate one or more confirmations corresponding to a booked appointment for providing the requested service from the plurality of services; and
transmit the generated one or more confirmations to the service provider and the user.

6. The system of claim 4, wherein the processor is further configured to provide a real-time status indicative of an availability of one or more executives from the plurality of executives tasked with providing one or more services from the plurality of services.

7. The system of claim 6, wherein the plurality of UI objects enable communication between the user and the one or more executives using one or more of: a telephone call, a voice over Internet (VoIP) call, a chat, a video conference, email, a screen-sharing session, a whiteboard, and short messaging service (SMS).

8. The system of claim 6, wherein the processor is configured to provide one or more interface to each executive from the one or more executives for one or more of:
tracking one or more requests received from a plurality of users corresponding to requested services from the plurality of services;
establishing communication with a user from the plurality of users; and
generating one or more insights corresponding to the one or more requests serviced by an executive from the one or more executive.

9. The system of claim 1, wherein the processor is further configured to render one or more UI objects to the user for providing feedback corresponding to a service provided to the user by an executive.

10. The system of claim 1, wherein the electronic device is one of a Virtual Reality (VR) glass, Personal Digital Assistant (PDA), laptop, desktop, tablet.

11. A method of providing virtual services, the method comprising:
generating, by a virtual service platform, a virtual environment comprising a plurality of user interface (UI) objects that corresponds to a plurality of services provided by a service provider, wherein the plurality of services are categorized in one or more categories, and wherein each of the one or more categories of services is associated with one or more users from a plurality of users;
tagging a plurality of executives capable of servicing an associated service from the plurality of services while generating the plurality of UI objects of the virtual environment, wherein the plurality of executives is clustered into a separate UI object cluster of the plurality of the UI objects to be displayed in the virtual environment based on the tagging;
rendering, by the virtual services platform, the generated plurality of UI objects to navigate a virtual space on an electronic device of a user in a manner to provide a user experience (UX) to the user that emulates a physical experience of the user with the bank, wherein the plurality of UI objects are grouped in one or more sections each corresponding to the one or more categories of services;
processing, by the virtual services platform, a request received from the user corresponding to a selection of a UI object from the rendered plurality of UI objects to determine a service which is to be provided to the user; and
providing, by the virtual services platform, the determined service to the user that corresponds to the selected UI object.

12. The method of claim 11, wherein the service provider corresponds to a bank and the plurality of services comprise one or more services for providing banking services, one or more services for booking appointment, one or more services for exchange of documents, and one or more services for providing customer support.

13. The method of claim 11, wherein the plurality of UI objects comprises UI objects corresponding to a stock price listings, real-time news flashes, advertisements, weather information, listing of banking services provided by a bank, one or more tutorials for availing the listed services, Universal Resource Locator (URLs) corresponding to social networking pages of the bank, and notice board.

14. The method of claim 12, wherein the booking of an appointment comprises:
selection of a date and time of the appointment, selection of a category of requested service, and selection of an executive from a plurality of executives capable of providing the requested service.

15. The method of claim 12, further comprising:
generating one or more confirmations corresponding to a booked appointment for providing the requested service from the plurality of services; and
transmitting the generated one or more confirmations to the service provider and the user.

16. The method of claim 14, further comprising providing a real-time status indicative of an availability of one or more executives from the plurality of executives tasked with providing one or more services from the plurality of services.

17. The method of claim 16, wherein the plurality of UI objects enable communication between the user and the one or more executives using one or more of: a telephone call, a voice over Internet (VoIP) call, a chat, a video conference, email, a screen-sharing session, a whiteboard, and short messaging service (SMS).

18. The method of claim 16, further comprising providing one or more interface to each executive from the one or more executives for one or more of:
tracking one or more requests received from a plurality of users corresponding to requested services from the plurality of services;
establishing communication with a user from the plurality of users; and
generating one or more insights corresponding to the one or more requests serviced by an executive from the one or more executive.

19. The method of claim 11, the one or more UI objects from the plurality of UI objects enable the user in providing feedback corresponding to a service provided to the user by an executive.

20. A non-transitory computer-readable storage medium storing instructions, which when executed by a processor enable the processor to execute a one or more operations for providing virtual services, the one or more operations comprising:

generating a virtual environment comprising a plurality of user interface (UI) objects that corresponds to a plurality of services provided by a service provider, wherein the plurality of services are categorized in one or more categories, and wherein each of the one or more categories of services is associated with one or more users from a plurality of users;

tagging a plurality of executives capable of servicing an associated service from the plurality of services while generating the plurality of UI objects of the virtual environment, wherein the plurality of executives is clustered into a separate UI object cluster of the plurality of the UI objects to be displayed in the virtual environment based on the tagging;

rendering the generated plurality of UI objects to navigate a virtual space on an electronic device of a user in a manner to provide a user experience (UX) to the user that emulates a physical experience of the user with the service provider, wherein the plurality of UI objects are grouped in one or more sections each corresponding to the one or more categories of services;

processing a request received from the user corresponding to a selection of a UI object from the rendered plurality of UI objects to determine a service which is to be provided to the user; and providing the determined service to the user that corresponds to the selected UI object.

* * * * *